United States Patent [19]

Later et al.

[11] Patent Number: 5,375,431
[45] Date of Patent: Dec. 27, 1994

[54] APPARATUS AND METHODS FOR VACUUM COOLING FRESH PRODUCE

[76] Inventors: Roger C. Later, 1427 Euclid St., Santa Monica, Calif. 90404; Roger D. Later, 11734 Gateway Blvd., Los Angeles, Calif. 90064

[21] Appl. No.: 845,892

[22] Filed: Mar. 4, 1992

[51] Int. Cl.$^5$ .............................. F25B 19/00
[52] U.S. Cl. .............................. 62/268; 62/288; 62/376
[58] Field of Search .................. 62/268, 288, 376

[56] References Cited

U.S. PATENT DOCUMENTS

| | | | |
|---|---|---|---|
| 3,844,132 | 10/1974 | Miller et al. | 62/268 |
| 4,061,483 | 12/1977 | Burg | 62/268 |
| 4,141,224 | 2/1979 | Alger et al. | 62/268 |
| 4,407,140 | 10/1983 | Kobayashi | 62/268 |
| 4,576,014 | 3/1986 | Miller et al. | 62/268 |
| 4,615,178 | 10/1986 | Badenhop | 62/268 |
| 4,776,181 | 10/1988 | Maule | 62/376 |
| 4,882,911 | 11/1989 | Immel | 62/288 |
| 4,942,053 | 7/1990 | Franklin et al. | 62/100 |

*Primary Examiner*—Ronald C. Capossela

[57] ABSTRACT

A vacuum cooler for produce and the like comprising a vacuum tube forming a vacuum chamber into which produce is placed. A vacuum pump lowers the atmospheric pressure while cold water is gently sprayed onto the produce. Water vapor from the produce is condensed, and directed to a sump in the chamber without permitting such condensed water to impinge on the produce. The cooler includes a venting system that admits outside air into the vacuum chamber, gradually returning the chamber to atmospheric pressure, and permitting removal of produce from the chamber.

16 Claims, 1 Drawing Sheet

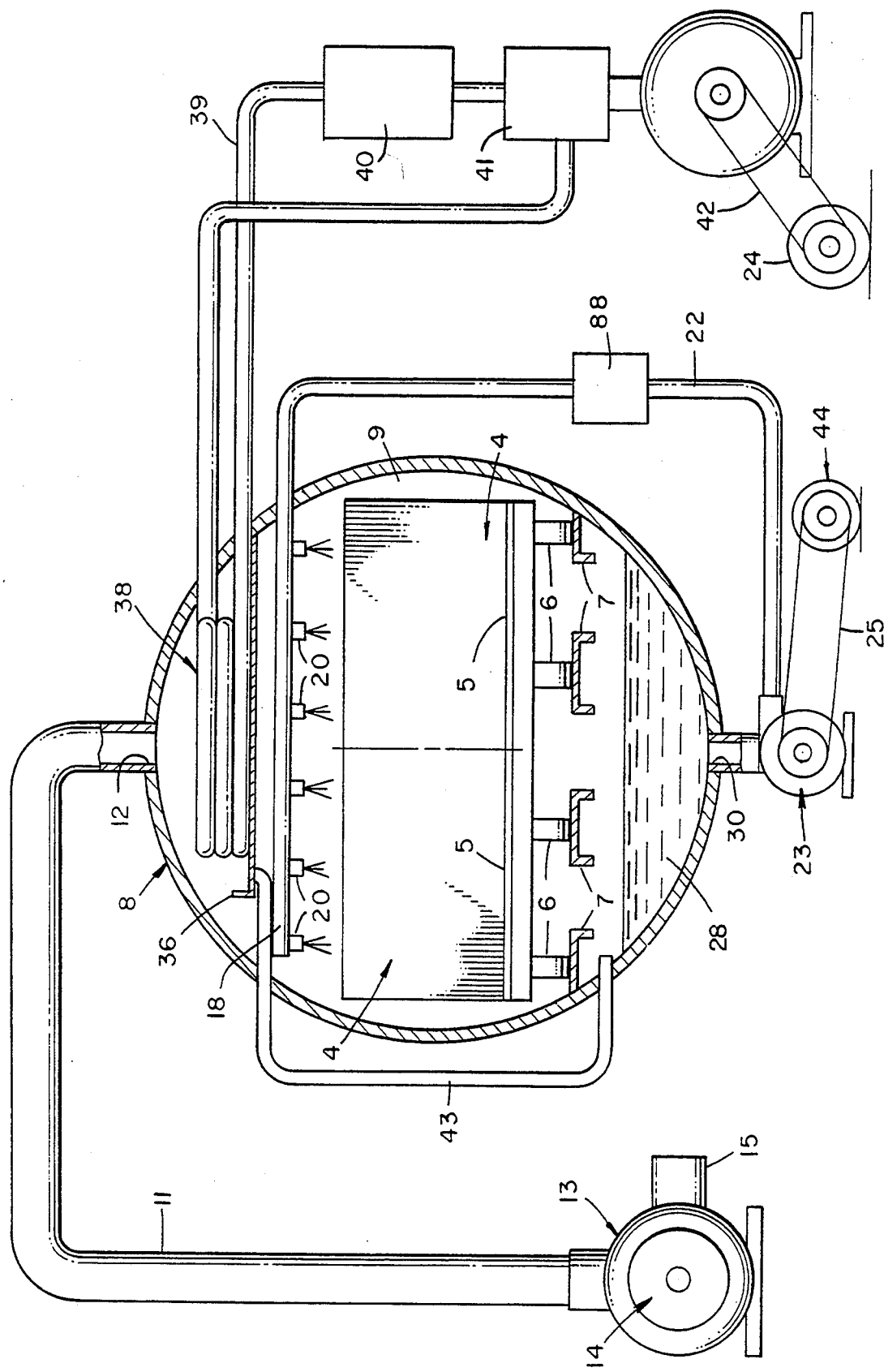

APPARATUS AND METHODS FOR VACUUM COOLING FRESH PRODUCE

FIELD OF THE INVENTION

Apparatus and methods for vacuum cooling fresh produce, especially soft, porous produce, includes a vacuum chamber comprising a mechanism for subjecting such produce to sub-atmospheric pressure and direct contact with gentle sprays of cool water for cooling the produce. The chamber includes a venting system which minimizes vacuum infiltration of moisture into the produce, and minimizes spraying, splashing or draining unwanted produce-damaging water onto the produce.

BACKGROUND OF THE INVENTION

It is necessary to remove field heat and chill produce to preserve the produce during shipment to market. Some methods of cooling produce appear in U.S. Pat. No. 3,844,132, Produce Cooler and Method of Cooling Product, Issued on Oct. 29, 1974, and in U.S. Pat. No. 4,576,014, issued Mar. 18, 1986, and entitled *Improved Vacuum Cooler With Improved Venting*. These patents describe apparatus comprising a vacuum chamber for receiving the produce. A vacuum pump reduces the pressure within the chamber to sub-atmospheric level, causing evaporation of moisture from the produce. This evaporation removes heat from the produce, thereby reducing its temperature. Water vapor formed by such vaporization condenses on cooling coils positioned over the produce.

Additionally, a recirculation system picks up water from a reservoir at the bottom of the vacuum chamber and sprays it over the produce for a further cooling effect.

Such chambers include a venting system to permit outside air to flow into the vacuum chamber, and to raise the pressure inside the chamber to atmospheric pressure before the chamber is opened.

One result of a rapid pressure increase within the vacuum chamber is vacuum infiltration of moisture into the produce. Softer, more porous produce such as lettuce, cabbage and spinach are especially vulnerable to such infiltration. This phenomenon occurs when water lying on the surface of the produce during rapid pressurization is forced into the produce because the internal pressure of the produce rises more slowly than its external pressure. While no permanent harm is done to the produce, the water saturated area remains until evaporation of the water occurs. During this period, water-infiltrated areas appear bruised or discolored, and are unappealing to buyers.

In U.S. Pat. No. 4,576,014, vacuum venting takes place through a separate pipe extending into the vacuum chamber beneath the surface of the water in the sump area. When the vacuum is released beneath the water surface, the water can erupt, coating the produce with unwanted water from the sump. This unwanted water can accelerate rot and spoilage during storage and shipment.

It is an object of this invention to provide a vacuum cooling apparatus which minimizes both vacuum infiltration of the produce, and unwanted water applications to the produce.

SUMMARY OF THE INVENTION

A produce cooler comprises a vacuum chamber including means for forming a partial vacuum inside the chamber for cooling, by an evaporative process, produce placed into the chamber.

The chamber also includes a mechanism for cooling and condensing water vapor in the chamber such that the cooled, condensed water passes into a collector, and is fed from the collector to a sump in the chamber, thus substantially preventing unwanted water from falling on, and thereby bruising or discoloring the produce in the chamber. Alternatively, the cooler/condenser can be placed in a passageway between the chamber and the device used to form a partial vacuum in the chamber.

The chamber includes means for venting the chamber to the outside atmosphere pressure gradually, slowly and evenly, through water nozzles positioned above the produce. These nozzles also direct water onto the produce sufficiently gently to minimize water infiltration into the produce, and to minimize the application of excessive water to the produce. Chamber venting can be done by admitting air, one or more insert gases such as nitrogen, one or more active gases such as pesticides, a mixture of air with one or more inert gases, or a mixture of inert gases into the chamber. Liquids such as water can also be used for this purpose.

The invention also comprises a method for cooling produce, particularly soft, porous produce such as lettuce, cabbage, celery, and spinach, comprising placing the produce in a vacuum chamber; forming a partial vacuum in the chamber; gently discharging water onto the produce with a force insufficient to cause water to infiltrate into the produce, or to otherwise bruise the produce, but allowing such water to flow downwardly over the produce; and cooling and condensing water vapor formed in the chamber while preventing the cooled, condensed water vapor from passing directly onto the produce. In preferred embodiments, the method also includes collecting the condensed water vapor while preventing the condensed water vapor from flowing onto the produce, and recycling the condensed water vapor for use in gently discharging water onto the produce. In preferred embodiments, the method also includes gradually, and preferably slowly and evenly, releasing the partial vacuum within the chamber while minimizing collection or formation of additional water on the produce during the releasing of the partial vacuum in the chamber.

DESCRIPTION OF THE DRAWINGS

The FIGURE is a cross-sectional view of a preferred embodiment of the produce cooling apparatus of this invention.

DESCRIPTION OF THE INVENTION

The FIGURE shows a produce cooler for removing field heat and for thereby cooling soft, porous produce such as lettuce, celery, spinach and cabbage. The produce is placed in containers or cartons 4 stacked on a cart 5 supported on wheels 6 positioned to run on rails 7 extending from the outside to the interior of vacuum tube 8. Usually, the produce is packed in ventilated cartons that are stacked on the carts 5 at a manageable height.

Vacuum tube 8 forms a vacuum chamber 9 which receives carts 5. Tube 8 is formed of metal of sufficient strength to permit a substantial partial vacuum to be drawn in chamber 9. Usually, chamber 8 includes end doors (not shown) to allow carts 5 to be rolled in and out.

For evacuating chamber 9, duct 11 connects with opening 12 in the upper surface of vacuum tube 8 and extends to vacuum pump 13 driven by motor 14 that includes outlets 15 for discharging evacuated air into the atmosphere. Thus, the produce containers 5 can be moved into vacuum tube 8 on carts 5, and a partial vacuum can then be drawn in tube 8 to cause evaporation of moisture from the produce, thereby cooling the produce as such evaporation takes place. For a further cooling effect, a water manifold 18 is positioned over the produce. Manifold 18 includes a plurality of spray nozzles 20 for spraying water onto the produce, and for returning the chamber for atmospheric pressure. A pipe 22 connects with a pump 23 driven by an electric motor 44 connected to pump 23 by belt 25. Inlet duct 30 connects with pump 23 to supply water from a sump 28 in the bottom of vacuum tube 8. Some kinds of produce are adequately cooled by imposing a partial vacuum alone, and without spraying water onto the produce. For such produce, condensed water is simply removed from sump 28, and is not recycled to manifold 18.

Water pump 23 pumps water through pipe 22, manifold 18, and spray nozzles 20 onto the produce. This water flows downwardly over the produce and eventually flows, by gravity, into sump 28. This downward flow of water augments the vaporization process by absorbing field heat from the produce.

To minimize the amount of water reaching pump 13, refrigerator coil 38 is positioned above the produce in vacuum tube 8. Coil 38 condenses water vapor from the produce, preventing water from reaching pump 13. Coil 38 also provides additional cooling for produce in tube 8. The coil is supplied with cold refrigerant through an inlet pipe 39 leading from refrigerator mechanism 40. Connecting with this mechanism is refrigeration compressor 41. Motor 24 drives compressor 41 by means of drive belt 42. The refrigerant in coil 38 causes water vapor to condense and collect on coil 38, forming water droplets which fall by gravity into a collection device 36. This collected water then flows through drain pipe 43 into sump 28. Collector 36 prevents the condensed water from falling onto the produce, thus preventing the bruising and discoloration that would otherwise occur.

Water is cooled by contact with coil 38, which tends to further remove heat from the produce when sprayed on it. The reservoir of water in sump 28 also provides sufficient humidity to slow produce dehydration.

After the produce is cooled, valve 88 is opened to allow air to flow from the outside atmosphere through sprinkler supply pipe 22, and sprinkler nozzles 20, into vacuum chamber 9. This action raises the pressure inside chamber 9 to the outside pressure, allowing the chamber doors to be opened and the produce on carts 5 to be removed.

Thus, the produce is moved into chamber 9, the chamber doors are closed and sealed, and a partial vacuum is drawn for evaporative cooling. Pumps are started for gently spraying water over the produce, and for circulating refrigerant through the cooling coils for condensing water from the vapor. After the produce is sufficiently cooled by removal of field heat, air is allowed to flow into chamber 9 by opening valve 88 to raise the internal pressure of the chamber to the outside atmospheric level. Thereafter, the chamber doors can be opened for removal of the chilled produce and insertion of unchilled produce.

One of the problems with such a process is vacuum infiltration of water into areas of the produce surfaces. Where infiltration occurs, the produce is discolored and appears to be bruised. The moisture should evaporate within 24-48 hours, with minimal damage to the produce, but marketing is hindered because the discoloration appears to be bruising.

This bruising can also occur when water condensed on coil 38 is allowed to fall on the produce. When sprinkler nozzles 22 are operating, a fine mist covers the top layer of produce, and then percolates downwardly onto the lower layers of produce. This misted spray is very different from the falling water that results when condensed water vapor falls on the produce. Such uncontrolled water flow onto the produce impairs its marketability.

Pressure differentials and rapid pressure increases within vacuum chamber 9 can also cause vacuum infiltration of water into the produce. Sprinkler manifold 18 preferably extends substantially the length and width of vacuum chamber 9. In releasing the vacuum pressure slowly through the sprinkler nozzles 22, the pressure differential within the vacuum chamber 9 is minimized, resulting in minimal vacuum infiltration of the produce.

What is claimed is:

1. A produce cooler comprising:

a vacuum chamber including a support for produce in said chamber;

means for forming a partial vacuum in said chamber;

means in said chamber for discharging water onto said produce to minimize water infiltration onto said produce and to allow said water to flow downwardly over said produce;

means for cooling and condensing water vapor in said chamber;

means for collecting condensed water vapor and for preventing said condensed water vapor from flowing directly onto said produce; and means for releasing said partial vacuum within said chamber to minimize damage to said produce and to minimize water dispersion onto said produce during said releasing.

2. The produce cooler of claim 1 further comprising a sump in said chamber for receiving condensed water vapor from said produce.

3. The produce cooler of claim 2 further comprising means connected to said sump for circulating condensed water vapor from said sump to said water discharging means in said chamber.

4. The produce cooler of claim 1 wherein said means for cooling and condensing water vapor in said chamber comprises refrigeration means positioned in said chamber above said support.

5. The produce cooler of claim 1 wherein said means for forming a partial vacuum in said chamber includes a vacuum-forming pump connected to said vacuum chamber by a duct connected to an opening in said vacuum chamber.

6. The produce cooler of claim 1 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

7. A method for removing heat from field-harvested produce comprising placing said produce in a vacuum chamber on a support for said produce; forming a partial vacuum in the chamber; discharging water onto said produce while minimizing water infiltration into said produce and while minimizing collection of unwanted water on said produce; releasing said partial vacuum within said chamber to minimize damage to said produce and to minimize water dispersion onto said produce; cooling and condensing water vapor formed in the chamber, and preventing the condensed water vapor from flowing directly onto said produce.

8. The method of claim 7 further comprising collecting said condensed water vapor in said chamber, and reusing said condensed water vapor in said spraying.

9. The produce cooler of claim 1 wherein said means for releasing said partial vacuum within said chamber is in said water discharging means.

10. A produce cooler comprising:
a vacuum chamber including a support for produce in said chamber;
means for forming a partial vacuum in said chamber;
means in said chamber for discharging water onto said produce to minimize water infiltration onto said produce and to allow said water to flow downwardly over said produce;
means for cooling and condensing water vapor in said chamber; and
means for releasing said partial vacuum within said chamber through said water discharging means to minimize damage to said produce and to minimize water dispersion onto said produce during said releasing.

11. The produce cooler of claim 10 further comprising means for collecting condensed water vapor and for preventing said condensed water vapor from falling directly onto said produce.

12. The produce cooler of claim 10 further comprising a sump in said chamber for receiving condensed water vapor from said produce.

13. The produce cooler of claim 12 further comprising means connected to said sump for circulating condensed water vapor from said sump to said water discharging means in said chamber.

14. The produce cooler of claim 10 wherein said means for cooling and condensing water vapor in said chamber comprises refrigeration means positioned in said chamber above said support.

15. The produce cooler of claim 10 wherein said means for forming a partial vacuum in said chamber includes a vacuum-forming pump connected to said vacuum chamber by a duct connected to an opening in said vacuum chamber.

16. The produce cooler of claim 10 wherein said means for cooling and condensing water vapor in said chamber is positioned above said support, and above a collector positioned below said condenser for receiving condensed water vapor, said collector being connected to a sump at the bottom of said chamber to receive condensed water vapor from said collector.

* * * * *